US009963793B2

United States Patent
Ono et al.

(10) Patent No.: US 9,963,793 B2
(45) Date of Patent: May 8, 2018

(54) CELL UNIT, CELL STACK DEVICE, CELL UNIT DEVICE AND MODULE

(71) Applicant: KYOCERA Corporation, Kyoto-shi, Kyoto (JP)

(72) Inventors: Takashi Ono, Kirishima (JP); Shinpei Shiraishi, Kirishima (JP); Naruto Takahashi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 208 days.

(21) Appl. No.: 14/899,022

(22) PCT Filed: Jun. 19, 2014

(86) PCT No.: PCT/JP2014/066304
§ 371 (c)(1),
(2) Date: Dec. 16, 2015

(87) PCT Pub. No.: WO2014/208448
PCT Pub. Date: Dec. 31, 2014

(65) Prior Publication Data
US 2016/0122884 A1    May 5, 2016

(30) Foreign Application Priority Data

Jun. 28, 2013   (JP) .................................. 2013-136829
Jul. 11, 2013   (JP) .................................. 2013-145580

(51) Int. Cl.
*C25B 9/18*    (2006.01)
*C25B 11/03*   (2006.01)
(Continued)

(52) U.S. Cl.
CPC .................. *C25B 9/18* (2013.01); *C25B 1/04* (2013.01); *C25B 9/08* (2013.01); *C25B 11/03* (2013.01);
(Continued)

(58) Field of Classification Search
CPC ......................................... C25B 11/03–11/035
(Continued)

(56) References Cited

U.S. PATENT DOCUMENTS

| 4,648,945 | A | * | 3/1987 | Isenberg ................... C25D 5/54 |
| | | | | 205/118 |
| 5,200,279 | A | * | 4/1993 | Draper .............. H01M 8/04014 |
| | | | | 429/466 |

(Continued)

FOREIGN PATENT DOCUMENTS

| JP | 05-101842 A | 4/1993 |
| JP | 2004-281094 A | 10/2004 |

(Continued)

OTHER PUBLICATIONS

International Search Report (Form PCT/ISA/210) dated Sep. 16, 2014 and issued for International Application No. PCT/JP2014/066304.

(Continued)

*Primary Examiner* — Harry D Wilkins, III
(74) *Attorney, Agent, or Firm* — Procopio Cory Hargreaves and Savitch LLP

(57) ABSTRACT

A cell unit includes a cell stack, two manifolds. The cell stack includes cells. Each cell has a elliptical columnar shape. The each cell includes an inner electrode layer, a solid oxide solid electrolyte layer, an outer electrode layer, a first portion, a second portion, a middle portion and a distribution hole. The solid oxide solid electrolyte layer is on the inner electrode layer. The outer electrode layer is on the solid oxide solid electrolyte layer. The first portion is at one end of the each cell in the length direction of the cells. The second portion is at the other end of the each cell in the length direction. The middle portion is located between the first portion and the second portion. The distribution hole passes through from the first portion to the second portion. A first manifold fixes the first portions. A second manifold fixes the second portions.

14 Claims, 11 Drawing Sheets

(51) Int. Cl.
*C25B 1/04* (2006.01)
*H01M 8/2425* (2016.01)
*H01M 4/86* (2006.01)
*H01M 8/0202* (2016.01)
*H01M 8/04007* (2016.01)
*C25B 9/08* (2006.01)
*H01M 8/124* (2016.01)

(52) U.S. Cl.
CPC ............ *C25B 11/035* (2013.01); *H01M 4/861* (2013.01); *H01M 8/0202* (2013.01); *H01M 8/04007* (2013.01); *H01M 8/2425* (2013.01); *H01M 2008/1293* (2013.01); *Y02E 60/366* (2013.01)

(58) Field of Classification Search
USPC ........................................................ 204/241
See application file for complete search history.

(56) References Cited

U.S. PATENT DOCUMENTS

| | | | | |
|---|---|---|---|---|
| 6,376,118 | B1* | 4/2002 | Bruck | C25B 11/035 |
| | | | | 429/480 |
| 8,652,308 | B2* | 2/2014 | Aujollet | C25B 1/04 |
| | | | | 204/241 |
| 9,831,514 | B2* | 11/2017 | Wuillemin | H01M 8/04768 |
| 2003/0008194 | A1* | 1/2003 | Cargneli | H01M 8/04089 |
| | | | | 429/413 |
| 2010/0086824 | A1* | 4/2010 | Homel | C25B 1/00 |
| | | | | 429/406 |
| 2010/0140102 | A1* | 6/2010 | Aujollet | C25B 1/04 |
| | | | | 205/628 |
| 2013/0089810 | A1* | 4/2013 | Hiraiwa | B01D 53/326 |
| | | | | 429/504 |
| 2013/0266883 | A1* | 10/2013 | Seo | H01M 8/04089 |
| | | | | 429/456 |
| 2013/0330648 | A1* | 12/2013 | Kim | C25B 9/18 |
| | | | | 429/459 |
| 2016/0064752 | A1* | 3/2016 | Kawakami | H01M 8/0202 |
| | | | | 429/482 |

FOREIGN PATENT DOCUMENTS

| | | | | |
|---|---|---|---|---|
| JP | 2007-265650 | A | | 10/2007 |
| JP | 2008-235286 | A | | 10/2008 |
| JP | 2010-189709 | A | * 9/2010 | ............... C25B 9/04 |
| JP | 2011-129489 | A | | 6/2011 |
| JP | 2012-041568 | A1 | | 3/2012 |
| WO | 2010/057257 | A1 | | 5/2010 |

OTHER PUBLICATIONS

Extended European Search Report dated Dec. 8, 2016, issued by the European Patent Office in counterpart European Patent Application No. 14 818056.5.

* cited by examiner

CELL UNIT, CELL STACK DEVICE, CELL UNIT DEVICE AND MODULE

TECHNICAL FIELD

The present invention pertains to a cell unit, a cell stack device, a cell unit device, and a module.

BACKGROUND

Currently, a water electrolysis device using a cell has been proposed as technology to manufacture hydrogen ($H_2$).

A device that generates hydrogen by an electrode body being provided on both sides of a polymer electrolyte membrane, stacking a unit made by disposing a power feeding body on both of these sides, and decomposing water supplied to an outer electrode layer side of the power feeding unit by applying a voltage to both ends in the direction of the stack is known as such an water electrolysis device (see Patent Document 1 for example).

In addition, in recent years a high temperature electrolysis method using a cell provided with a solid oxide electrolyte membrane (SOEC) has been proposed as another method for manufacturing hydrogen.

PRIOR ART DOCUMENT

Patent Document

Patent Document 1: Japanese Unexamined Patent Application Publication No. 2012-41568A

SUMMARY OF THE INVENTION

Problems to be Solved by the Invention

However, there is room for improvement with regards to a specific configuration, in particular for a water electrolysis device using a cell provided with a solid oxide electrolyte (SOEC).

Therefore, an object of the present invention is to provide a cell unit, a cell stack device, a cell unit device, and a module having more specific configurations.

Means to Solve the Problem

A cell unit of the present invention includes a cell stack, a first manifold and a second manifold. The cell stack includes a plurality of cells. Each cell of the plurality of cells has a elliptical columnar shape. The each cell includes an inner electrode layer, a solid oxide solid electrolyte layer, an outer electrode layer, a first portion, a second portion, a middle portion and a distribution hole. The solid oxide solid electrolyte layer is located on the inner electrode layer. The outer electrode layer is located on the solid oxide solid electrolyte layer. The first portion is at one end of the each cell in the length direction of the cells. The second portion is at the other end of the each cell in the length direction. The middle portion is located between the first portion and the second portion. The distribution hole passes through from the first portion to the second portion. The first manifold fixes the first portions of the plurality of cells. The first manifold supplies gas to the distribution holes of the plurality of cells. The second manifold fixes the second portions of the plurality of cells. The second manifold recovers gas discharged from the distribution holes of the plurality of cells.

In addition, according to a cell stack device of the present invention, the cell stack device includes the cell unit and a heating body for heating a middle portion side in the longitudinal direction of the plurality of cells.

In addition, according to a cell unit device of the present invention, a plurality of cell units are arranged in parallel in the vertical direction so that the plurality of cells of each cell unit of the plurality of cell units are disposed in the horizontal direction.

In addition, according to a module of the present invention, the module is configured to house the cell unit, the cell stack device, or the cell unit device in a housing container.

Furthermore, according to the module of the present invention, the module is formed by housing the cell unit or the cell unit device in the housing container; and a heating body for heating the middle portion side of the plurality of cells in the longitudinal direction is installed in the housing container, the heating body being provided separately from the cell unit or the cell unit device.

Effect of the Invention

A cell unit of the present invention can easily supply gas to a cell and can easily recover gas discharged from the cell.

In addition, a cell stack device of the present invention can improve reaction efficiency because the temperature in the middle portion side of the cell with good reaction efficiency can be raised by way of a heating body.

In addition, a cell unit device of the present invention can easily recover the gas discharged from the cell with a simple configuration.

Furthermore, a module of the present invention can be a module with improved reaction efficiency.

BRIEF DESCRIPTION OF THE DRAWING(S)

BEST MODE FOR CARRYING OUT THE INVENTION

Figure 1A:
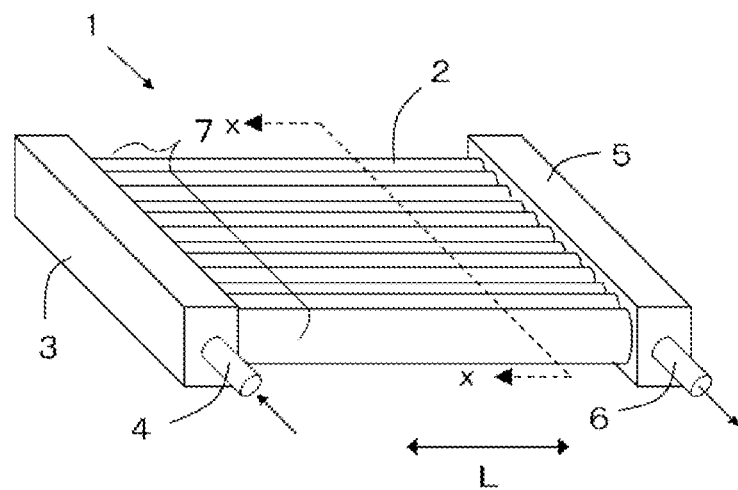
FIG. 1A is an external perspective view illustrating one example of a cell unit of the present embodiment.
Figure 1B:
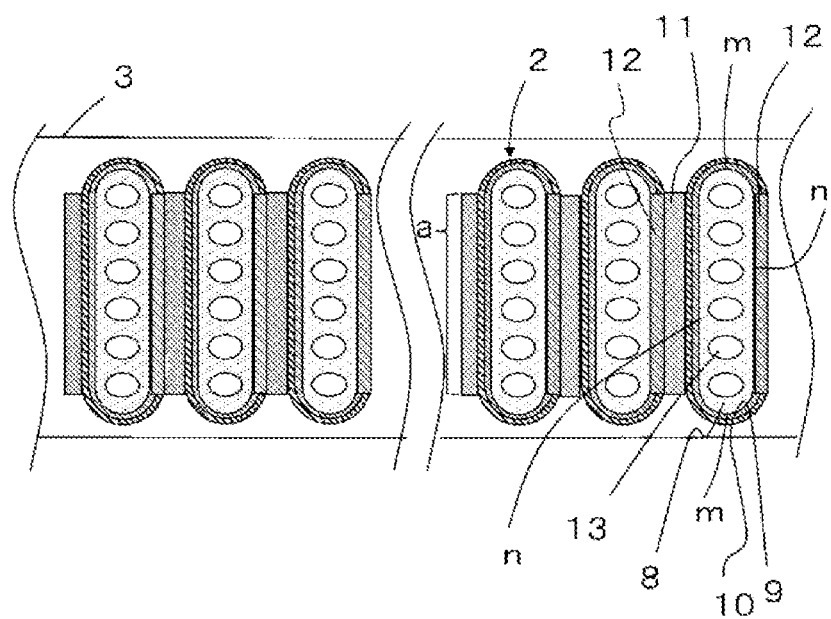
FIG. 1B is a cross-sectional view illustrating a cross section of FIG. 1A along the line x-x depicted in FIG. 1A with a portion omitted.

FIG. 1A is an external perspective view illustrating one example of a cell unit of the present embodiment. FIG. 1B is a cross-sectional view illustrating a cross section of FIG. 1A along the line x-x depicted in FIG. 1A with a portion omitted.

The cell unit 1 illustrated in FIG. 1A is provided with a cell stack 7 formed by columnar cells 2 being arranged, the cells include an inner electrode layer, a solid oxide solid electrolyte, and an outer electrode layer and include a distribution hole that passes from one end to the other end in the longitudinal direction. Note that the following describes an example of an electrolysis cell to perform electrolysis on water (water vapor) as the cell 2.

In addition, in the cell unit 1 illustrated in FIG. 1, the cell stack 7 formed by the cells 2 arranged in one row is depicted, but the cell stack 7 can be formed by being provided with a plurality of rows or a plurality of columns of cells 2.

The cells 2 are fixed to a first manifold 3 for one end portion to supply water vapor to the distribution hole. Note that an introduction pipe 4 for introducing water vapor to the interior of the first manifold 3 is connected to the first manifold 3. The cell 2 is described later, but here, when the cell 2 is formed by containing Ni, for example, the Ni is liable to be oxidized by the water vapor when only water vapor is supplied to the cell 2. When Ni is oxidized, a support body or the inner electrode layer containing Ni will undergo a volume change because of the oxidization and a solid electrolyte can be damaged due to excessive stress being generated on the solid electrolyte. Then, cross leakage in the solid electrolyte occurs and the performance of the cell 2 is significantly degraded. Therefore, in order to prevent this occurrence, oxidization of the cell 2 can be suppressed by adding a small amount of hydrogen to the water vapor.

Meanwhile, the other ends of the cells 2 are fixed to a second manifold 5 for recovering gas containing hydrogen discharged from the distribution hole. Note that a recovery pipe 6 for recovering the gas containing hydrogen is connected to the second manifold 5.

In other words, the cell unit 1 is configured to include the cells 2, the first manifold 3 to which one ends portion of the cells 2 are fixed, and the second manifold 5 to which the other ends of the cells 2 are mounted. The water vapor flowing to the first manifold 3 via the introduction pipe 4 is made into a gas containing hydrogen by way of electrolysis while flowing in the cells 2. The gas containing hydrogen is recovered by the recovery pipe 6 after flowing to the second manifold 5. By making the cell unit 1 into such a configuration, water vapor can be easily supplied to the cells 2 and the gas containing hydrogen discharged from the cells 2 can be easily recovered with a very simple configuration.

Here, the cell unit 1 illustrated in FIG. 1A is a configuration in which the cells 2 are disposed in the horizontal direction. If the cells 2 are provided so as to be erect, damage or the like to the cells 2 is liable to occur by the weight of the second manifold 5 positioned above the cells 2 being applied, but as illustrated in FIG. 1A, damage or the like to the cells 2 can be prevented from occurring with a configuration in which the cells 2 are disposed in the horizontal direction.

When a cell comprising a solid oxide solid electrolyte (SOEC cell) is used as the cell 2, a portion or all of the water vapor supplied to the cell 2 is decomposed into hydrogen and oxygen by generating a reaction, described by the reaction formula below, in the inner electrode layer and the outer electrode layer by supplying the water vapor to the cell 2 while heating the cell 2 to a range from 600 to 1000° C. and applying a voltage of 1.0 to 1.5 V (per cell). Note that the oxygen is discharged from the outer electrode layer, described below.

Inner electrode layer: 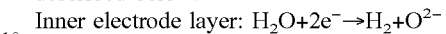$H_2O+2e^-\rightarrow H_2+O^{2-}$
Outer electrode layer: 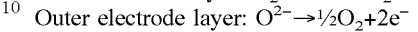$O^{2-}\rightarrow \frac{1}{2}O_2+2e^-$ Below, the configuration of the cell 2 is described using FIG. 1B. Note that FIG. 1B illustrates the cross-sectional view of the cell unit 1 illustrated in FIG. 1A with a portion thereof omitted.

As illustrated in FIGS. 1A and 1B, the cell 2 is a hollow and flat plate, the cross section is a flat shape, and is provided with a porous, conductive support body (referred to as a support body below) 8 having an elliptical columnar shape when viewed as a whole.

The inside of the support body 8 is formed so that distribution holes 13 with a suitable interval therebetween penetrate from one end to the other end along the length L of the cell 2. The cell 2 has a structure by which various members are provided on the support body 8. Note that the distribution holes 13 may be circular in the horizontal cross section of the cell 2.

As understood from the shape illustrated in FIG. 1B, the support body 8 is configured by a pair of flat faces n that are mutually parallel and side faces (arc sections) m connecting both ends of the pair of flat faces n. Both faces of the flat faces n are formed to be approximately parallel. A porous inner electrode layer 9 is provided so as to cover the surface of one of the flat faces n and both side faces m. Furthermore, a dense solid electrolyte layer 10 is layered so as to cover the inner electrode layer 9. In addition, a porous outer electrode layer 11 is layered on the solid electrolyte layer 10 so as to face the inner electrode layer 9. The portion where the inner electrode layer 9, the solid electrolyte layer 10, and the outer electrode layer 11 overlap is an element portion a (electrolytic element part). In addition, an interconnector 12 is layered on the other flat face n on which no inner electrode layer 9 and no solid electrolyte layer 10 are layered.

As is clear from FIG. 1B, the solid electrolyte layer 10 extends to the other flat face n side via the arc shaped side face m coupling both ends of the flat faces n, and both end faces of the interconnector 12 abut both end faces of the inner electrode layer 9 and the solid electrolyte layer 10. Note that both end portions of the interconnector 12 can be disposed so as to be stacked on both end portions of the solid electrolyte layer 10.

Note that a cohesion layer for firmly bonding the interconnector 12 and the support body 8 can be provided between the interconnector 12 and the support body 8. In addition, an anti-reaction layer can be provided between the solid electrolyte layer 10 and the outer electrode layer 11, the anti-reaction layer is for suppressing reaction products having high resistance generated by a component of the solid electrolyte layer 10 reacting with a component of the outer electrode layer 11.

Here, an electrolysis reaction can be generated in the cell 2 by causing water vapor to flow in the distribution holes 13 in the support body 8, heating to the predetermined actuation temperature described above, and applying the predetermined voltage described above between the inner electrode layer 9 and the outer electrode layer 11. Note that the voltage is applied by a current flowing to the cell 2 via the interconnector 12 stacked on the support body 8. Below, each configuration constituting the cell 2 is described in order.

The support body 8 is preferably formed from, for example, an iron group metal component and a specific inorganic oxide (such as a rare earth element oxide) because the support body 8 must be permeable to transmit the water vapor in order for the water vapor to penetrate to the solid electrolyte layer 10 and must be conductive for the current to flow via the interconnector 12.

Examples of the iron group metal component include an iron group metal simple substance, an iron group metal oxide, an iron group metal alloy or alloy oxide, and the like. More specifically, Fe, Ni, and Co can be used as the iron group metal, for example, and materials containing at least one of Ni and NiO as the iron group component or iron group metal oxide are preferable specifically because these are inexpensive. Note that Fe and Co may also be contained in addition to at least one of the Ni and the NiO. Note that NiO is reduced by the $H_2$ generated by the electrolysis reaction, and a portion or all of the NiO is present as Ni.

In addition, the rare earth element oxide is used to bring the thermal expansion coefficient of the support body 8 closer to the thermal expansion coefficient of the solid electrolyte layer 10, and the rare earth element oxide containing at least one element selected from the group consisting of Y, Lu, Yb, Tm, Er, Ho, Dy, Gd, Sm, and Pr can be used in combination with the iron group component. Specific examples of such a rare earth element oxide include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. $Y_2O_3$ and $Yb_2O_3$ are preferable because these have virtually no reaction with nor form a solid solution with oxides of the iron group metal, the thermal expansion coefficients are approximately the same as the solid electrolyte layer 10, and these are inexpensive.

Here, in terms of maintaining favorable conductivity for the support body 8 and of making the thermal expansion coefficient to be near the solid electrolyte layer 10, the volume ratio of the iron group metal component to the rare earth element oxide component is preferably from 35:65 to 65:35 volume percentage after firing-reduction. Note that when using Ni as the iron group metal component and $Y_2O_3$ as the rare earth element oxide component, it is preferably that the content of Ni and $Y_2O_3$ is such that Ni/(Ni+Y) is from 79 to 93 mol %. Note that other metal components and oxide components may be used in the support body 8 as long as the required characteristics are not impaired.

In addition, the support body 8 preferably has, in general, an apparent porosity of 30% or greater, specifically in the range of 35% to 50% because the support body 8 must have water vapor permeability. In addition, the conductivity of the support body 8 is preferably 50 S/cm or greater, more preferably 300 S/cm or greater, and even more preferably 440 S/cm or greater.

Note that the length of the flat face n of the support body 8 (the length of the support body 8 in the width direction) is, in general, preferably from 15 to 35 mm, the length of the side face m (arc length) is preferably from 2 to 8 mm, and the thickness of the support body 8 (the thickness between both faces of the flat face n) is preferably from 1.5 to 5 mm.

The inner electrode layer 9 causes an electrode reaction to occur and is preferably formed from a porous, electrically conductive ceramic that is publicly known. For example, the inner electrode layer can be formed from a $ZrO_2$ forming a solid solution with the rare earth element oxide or a $CeO_2$ forming a solid solution with the rare earth element oxide and at least one of Ni and NiO. Note that the rare earth elements described as examples for the support body 8 can be used as the rare earth element, and the rare earth element can be formed from a $ZrO_2$ (YSZ) forming a solid solution with $Y_2O_3$ and at least one of Ni and NiO.

The volume ratio of the content of a $ZrO_2$ forming a solid solution with the rare earth element oxide or a $CeO_2$ forming a solid solution with the rare earth element oxide in the inner electrode layer 9 to the content of Ni or NiO is preferably from 35:65 to 65:35 volume percentage after firing-reduction. Furthermore, the apparent porosity of the inner electrode layer 9 is no less than 15% and in particular preferably in the range of 20 to 40%, and the thickness thereof is preferably from 1 to 30 μm. For example, if the thickness of the inner electrode layer 9 is too small, performance is liable to be reduced, and if the thickness is too large, peeling or the like is liable to occur due to the difference in thermal expansion between the solid electrolyte layer 10 and the inner electrode layer 9.

In addition, in the example in FIG. 1B, the inner electrode layer 9 extends from one flat face n (the flat face n positioned on the left in the figure) to the other flat face n (the flat face n positioned on the right in the figure) via the side face m, but the inner electrode layer 9 may be formed only on the flat face n on the side where the outer electrode layer 11 is provided, for example, because it is sufficient for the inner electrode layer 9 to be formed in a position facing the outer electrode layer 11. In other words, a structure may be such that the inner electrode layer 9 is provided only on a flat face n, and the solid electrolyte layer 10 is formed on the inner electrode layer 9, on both side faces m, and on the other flat face n where no inner electrode layer 9 is formed.

The solid electrolyte layer 10 preferably uses a dense ceramic made from partially stabilized or stabilized $ZrO_2$ containing a rare earth element oxide such as $Y_2O_3$, $Sc_2O_3$, or $Yb_2O_3$ at from 3 to 15 mol %. In addition, Y is preferable as the rare earth element in light of being inexpensive. Furthermore, in terms of preventing the transmission of water vapor, the relative density (according to the Archimedes method) of the solid electrolyte layer 10 is preferably 93% or greater, and a dense material of 95% or greater relative density is particularly desirable. The thickness of the solid electrolyte layer 10 is preferably from 5 to 50 μm.

As described above, an anti-reaction layer can be provided between the solid electrolyte layer 10 and the outer electrode layer 11, described below, for the purpose of firming the bond between the solid electrolyte layer 10 and the outer electrode layer 11 and of suppressing the reaction products having high electric resistance generated by the components in the solid electrolyte layer 10 reacting with the components in the outer electrode layer 11.

The anti-reaction layer can be formed with a composition containing Ce (cerium) and another rare earth element, and for example, preferably includes the composition of $(CeO_2)_{1-x}(REO_{1.5})_x$, where RE is at least one of Sm, Y, Yb, and Gd, and x is a value satisfying $0<x\leq 0.3$. Furthermore, in terms of reducing electric resistance, using Sm and Gd as RE is preferable, and for example, the composition is preferably made from a $CeO_2$ forming a solid solution with $SmO_{1.5}$ or $GdO_{1.5}$ at from 10 to 20 mol %.

In addition, two layered anti-reaction layer can be formed for the purposes of firmly bonding the solid electrolyte layer 10 and the outer electrode layer 11 and further suppressing reaction products having high electric resistance generated by the components in the solid electrolyte layer 10 reacting with the components in the outer electrode layer 11.

The outer electrode layer 11 is preferably formed from an electrically conductive ceramic made of a so called $ABO_3$ type perovskite-type oxide. Such a perovskite-type oxide is preferably a transition metal-type perovskite oxide, in particular at least one type of a $LaMnO_3$ based oxide, a $LaFeO_3$ based oxide, and a $LaCoO_3$ based oxide with Sr and La coexisting in the A site, and $LaCoO_3$ based oxide is particularly preferable in terms of high electric conductivity at the actuation temperature of 600 to 1000° C. Note that Sr and La may be present in the A site, and Fe (iron) or Mn (manganese) together with Co (cobalt) may also be present in the B site in the perovskite-type oxide described above.

In addition, the outer electrode layer 11 must be permeable to oxygen gas, and therefore the electrically conductive ceramic (perovskite-type oxide) forming the outer electrode layer 11 preferably has an apparent porosity of 20% or greater and more preferably in the range of 30 to 50%. Furthermore, the thickness of the outer electrode layer 11 is preferably from 30 to 100 μm in light of the conductivity of the cell 2.

In addition, the interconnector 12 is stacked on the flat face n on the side of the support body 8 opposite to the outer electrode layer 11 side.

Although the interconnector 12 is preferably formed from an electrically conductive ceramic, the interconnector 12 must be resistant to reduction and oxidation in order to be in contact with the fluid containing hydrogen and the fluid containing oxygen. Consequently, in general, a lanthanum chromite-based perovskite-type oxide ($LaCrO_3$ based oxide) is preferably used as the electrically conductive ceramic resistant to reduction and oxidation. Furthermore, using a LaCrMgO3 based oxide with Mg present in the B site is particularly preferable for the purpose of bringing the thermal expansion coefficient closer to that of the support body 8 and the solid electrolyte layer 10. Note that the amount of Mg can be suitable adjusted to be specifically from 10 to 12 ppm/K so that the thermal expansion coefficient of the interconnector 12 is near the thermal expansion coefficients of the support body 8 and the solid electrolyte layer 10.

In addition, as described above, the cohesion layer for reducing the difference between the thermal expansion coefficients of the interconnector 12 and the support body 8 can be provided between the interconnector 12 and the support body 8.

Such a cohesion layer can have a composition similar to the inner electrode layer 9. For example, the cohesion layer can be formed from at least one of a group consisting of a rare earth element oxide, a $ZrO_2$ forming a solid solution with the rare earth element oxide, or a $CeO_2$ forming a solid solution with the rare earth element oxide and at least one of Ni and NiO. More specifically, the cohesion layer can be formed from, for example, a composition made of $Y_2O_3$ and at least one of Ni and NiO, a composition made of a $ZrO_2$ forming a solid solution with $Y_2O_3$ (YSZ) and at least one of Ni and NiO, or a composition made of a $CeO_2$ forming a solid solution with an oxide such as Y, Sm, Gd, or the like and at least one of Ni and NiO. Note that the volume ratio of the content of the $ZrO_2$ forming a solid solution with the rare earth element oxide or the $CeO_2$ forming a solid solution with the rare earth element oxide to the content of Ni or NiO is preferably from 40:60 to 60:40 volume percentage after firing-reduction.

Note that in FIG. 1B, the interconnector 12 of the one cell 2 is bonded to the outer electrode layer 11 of the other cell 2 adjacent to the one cell 2, thereby configuring the cell stack 7 in which the cells 2 are electrically connected together.

With such a cell stack 7, the cell 2 on which no outer electrode layer 11 is formed is used, a paste constituting the outer electrode layer 11 is applied on the interconnector 12 of the one cell 2, the paste forming the outer electrode layer 11 is applied on the solid electrolyte layer 10 of the other cell 2 adjacent to the one cell 2, then the faces on which the paste has been applied are bonded and then thermally treated. Thereby, the interconnector 12 of the one cell 2 and the outer electrode layer 11 of the other cell 2, these cells 2 being adjacent to each other, can be connected electrically by being directly bonded. Accordingly, the cell stack 7 can be made smaller.

Furthermore, although omitted from FIGS. 1A and 1B, an electrically conductive member for the end portion including an introduction unit for current to flow to the cell stack 7 (cell 2) is preferably disposed on both ends of the cell stack 7.

Note that it is sufficient for the interconnector 12 of the one cell 2 to be electrically connected to the outer electrode layer 11 of the other cell 2, and may, for example, be electrically connected via an electrically conductive member made from metal or the like.

Figure 2A:
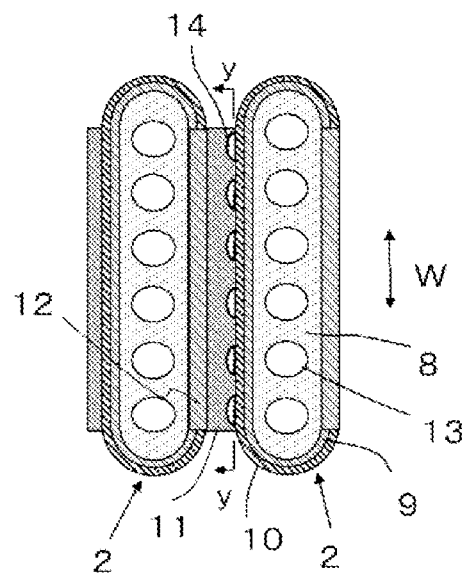
FIG. 2A is a cross-sectional horizontal view illustrating another example of a cell stack of the present embodiment.
Figure 2B:
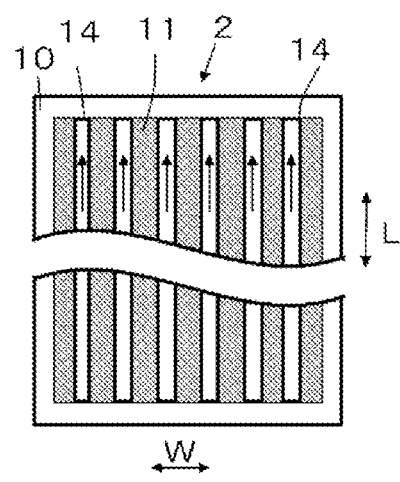
FIG. 2B is a cross-sectional vertical view along the line y-y in FIG. 2A.

FIG. 2A is a cross-sectional horizontal view illustrating another example of the cell stack of the present embodiment. FIG. 2B is a cross-sectional vertical view along the line y-y in FIG. 2A. Note that two cells 2 constituting the cell stack are selected to be illustrated in FIG. 2A.

As described above, because the outer electrode layer 11 has a predetermined porosity, a gas-flow passage is formed in the outer electrode layer 11 by many pores in communication. Therefore, gas can be discharged from the cell 2 and the cells 2 can be electrically connected using a simple structure that can expel oxygen generated in the electrolysis reaction to the outside of the outer electrode layer 11 via the gas-flow passage formed in the outer electrode layer 11.

However, it is preferable to provide a flow path in which the oxygen flows in order to more efficiently expel the oxygen generated in the electrolysis reaction.

Therefore, in the cell 2 illustrated in FIGS. 2A and 2B, a gas-flow passage 14 for discharging oxygen from the cell 2 is provided on the solid electrolyte side of the outer electrode layer 11. Note that in FIGS. 2A and 2B, the gas-flow passage 14 has a semi-circular cross-section shape, and as illustrated in FIG. 2B, is formed to be linear in the lengthwise direction L of the cell 2. Six passages are formed in the cell 2 disposed at predetermined intervals in the width direction.

Thereby, the oxygen generated with the outer electrode layer 11 can be discharged efficiently via the gas-flow passage 14.

For such a cell stack, first, the cell 2 on which no outer electrode layer 11 is formed is used, and then a paste constituting the outer electrode layer 11 is applied to the interconnector 12 of the one cell 2. Next, a resin paste is applied to and then dried on the solid electrolyte layer 10 of the other cell 2 adjacent to the one cell 2, and then six linear resin layers are formed in the lengthwise direction L of the cell 2. Then, the paste constituting the outer electrode layer 11 is applied to the solid electrolyte layer 10 of the other cell 2 in which the resin layer is formed, the faces of the one and the other cell 2 on which the paste constituting the outer electrode layer 11 has been applied are bonded together and thermally treated. Thereby, the gas-flow passage 14 is formed by the resin constituting the resin layer decomposing and dispersing, and the interconnector 12 of the one cell 2 adjacent to the other cell 2 and the outer electrode layer 11 of the other cell 2 can be connected electrically by being directly bonded.

Figure 3A:
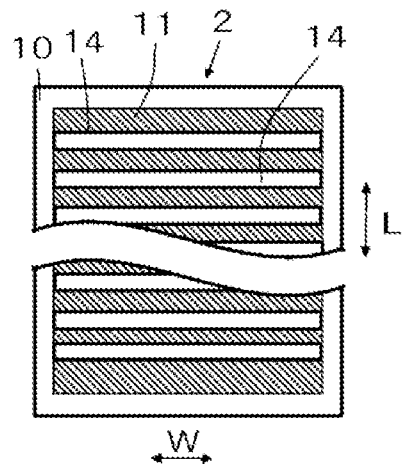
FIGS. 3A and 3B are cross-sectional vertical views illustrating an example of a cell of the present embodiment.
Figure 3B:
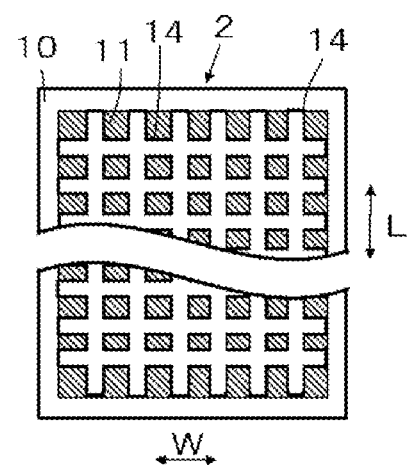

FIGS. 3A and 3B are cross-sectional vertical views illustrating an example of the cell of the present embodiment.

As illustrated in FIG. 3A, a similar effect as in FIGS. 2A and 2B can be obtained even when gas-flow passages 14 for discharging gas from the cell 2 are formed linearly in the width direction W of the cell 2 on the solid electrolyte side of the outer electrode layer 11. In this case, a plurality of gas-flow passages 14 can be formed linearly in the width direction W of the cell 2 by way of forming a plurality of the resin layers described above linearly in the width direction W of the cell 2.

Furthermore, as illustrated in FIG. 3B, a similar effect as in FIGS. 2A and 2B can be obtained even when the gas-flow passages 14 for discharging gas from the cell 2 are formed as a grid on the solid electrolyte side of the outer electrode layer 11.

Note that the gas-flow passage 14 is not limited to what is illustrated in FIGS. 2B and 3, but can be formed as a V-shaped gas flow passage, for example.

Figure 4A:
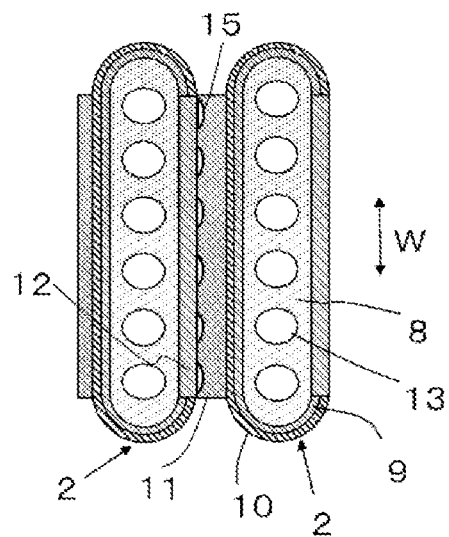
FIGS. 4A and 4B are cross-sectional horizontal views illustrating yet another example of a cell stack of the present embodiment.
Figure 4B:
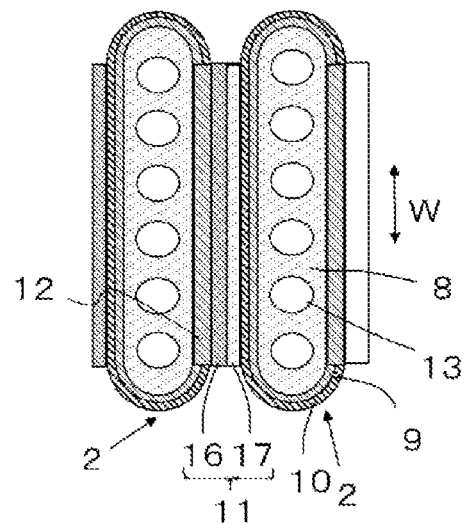

FIGS. 4A and 4B are cross-sectional horizontal views illustrating another example of the cell stack of the present embodiment.

FIG. 4A illustrates that the cell stack including a gas-flow passage 15 for discharging gas from the cell 2 at the interconnector 12 side of one cell 2 of the outer electrode layer 11 of the other cell 2. The gas-flow passages 15 are semi-circular in the cross sections and six of these are formed linearly in the cell 2 in the lengthwise direction L.

With such a cell stack, first, six resin layers are linearly formed in the lengthwise direction L of the cell 2 by using the cell 2 on which no outer electrode layer 11 is formed, applying a resin paste to the interconnector 12 of the one cell 2, and drying the resin paste. Next, the paste constituting the outer electrode layer 11 is applied to the interconnector 12 of the one cell 2 in which the resin layer is formed, and the paste constituting the outer electrode layer 11 is applied to the solid electrolyte layer surface of the other cell 2 adjacent to the one cell 2. Then, the faces of the one cell and the other cell on which the paste constituting the outer electrode layer 11 has been applied are bonded together and thermally treated. Thereby, the gas-flow passage 15 passage is formed on the interconnector 12 side of the one cell 2 by the resin constituting the resin layer decomposing and dispersing, and the interconnector 12 of the one cell 2 adjacent to the other cell 2 and the outer electrode layer 11 of the other cell 2 can be connected electrically by being directly bonded.

Thereby, the oxygen generated by the outer electrode layer 11 can be expelled to the outside via the gas-flow passage 15, and electrolysis performance can be improved because the area of the outer electrode layer 11 present on the surface of the solid electrolyte 4 is large.

Note that the gas-flow passage can be formed in the middle portion of the outer electrode layer 11, although this is not illustrated in the drawings. For such a gas-flow passage, first, a cell 2 on which no outer electrode layer 11 is formed is used, the paste constituting the outer electrode layer 11 is applied to the interconnector 12 of the one cell 2, and the paste constituting the outer electrode layer 11 is applied to the solid electrolyte layer surface of the other cell 2 adjacent to the one cell 2. Next, the faces of the one cell and the other cell on which the paste constituting the outer electrode layer 11 has been applied are bonded together via the resin layer and thermally treated. Thereby, the gas-flow passage 15 is formed in the middle portion of the outer electrode layer 11 by the resin constituting the resin layer decomposing and dispersing, and the interconnector 12 of the one cell 2 adjacent to the other cell 2 and the outer electrode layer 11 of the other cell 2 can be connected electrically by being directly bonded.

In FIG. 4B, the outer electrode layer 11 of the other cell 2 includes a porous layer 17 on the solid electrolyte layer 10 side, the porous layer 17 having a higher porosity than the interconnector 12 side of the one cell. And the pores in the porous layer 17 constitute the gas-flow passage by being continuous. In other words, the outer electrode layer 11 has higher porosity on the solid electrolyte side by way of having a two-layer structure of a low porosity layer 16 with a lower porosity than the porous layer 17 and a porous layer 17 with a high porosity.

With such a cell stack, first, a cell 2 on which no outer electrode layer 11 is formed is used, a first paste constituting the outer electrode layer 11 is applied on the interconnector 12 of the one cell 2, and a second paste (made from a resin containing more pore-imparting agents than the first paste) constituting the outer electrode layer 11 is applied to the solid electrolyte layer surface of the other cell 2 adjacent to the one cell 2. Next, the faces on which the paste constituting the outer electrode layer 11 are bonded together and thermally treated. Thereby, many pores are formed by the decomposition and dispersion of the pore-imparting agent made from the resin. The porous layer 17 with a higher porosity than the interconnector 12 side of the one cell 2 can be formed on the solid electrolyte layer 10 side of the outer electrode layer 11 of the other cell 2, and the interconnector 12 of the one cell 2 adjacent to the other cell 2 and the outer electrode layer 11 of the other cell 2 can be connected electrically by being bonded.

Thereby, the oxygen generated with the outer electrode layer 11 can be discharged efficiently via the gas-flow passage. Note that, in this case, a similar effect can be obtained even if the outer electrode layer 11 of the other cell 2 includes a porous layer on the solid electrolyte layer 10 side, with the porous layer including pores having a larger average diameter (higher porosity) than that of the interconnector 12 of the one cell 2.

Figure 5A:
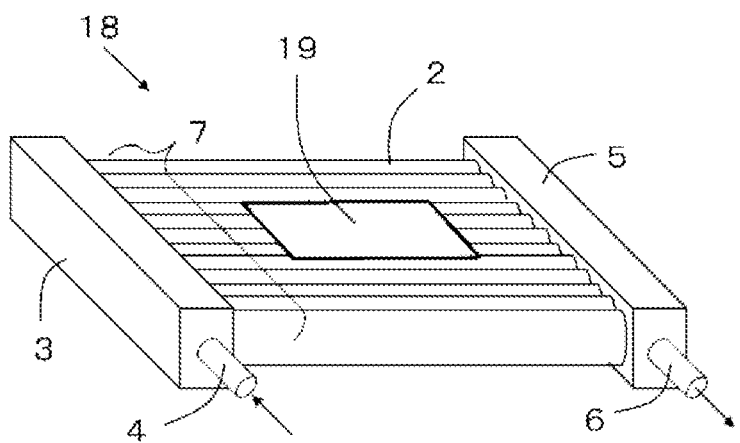
FIGS. 5A and 5B are external perspective views illustrating an example of a cell stack device of the present embodiment.
Figure 5B:
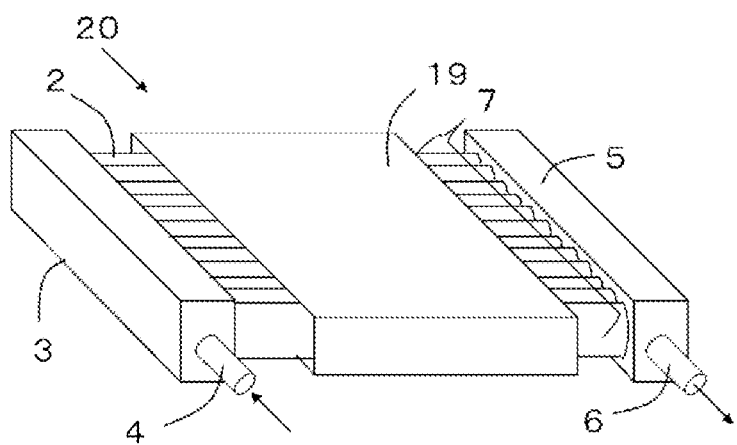

FIGS. 5A and 5B are external perspective views illustrating an example of the cell stack device of the present embodiment.

A cell stack device 18 illustrated in FIG. 5A includes the cell unit 1 illustrated in FIG. 1A and a heating body (a heater or the like) for heating the middle portion side of the cells 2 in the longitudinal direction.

As described above, the temperature of the cells 2 must be heated to a range from 600 to 1000° C. to perform an efficient electrolysis reaction in the cells 2. Therefore, the cell stack device 18 illustrated in FIG. 5A is provided with a heating body 19 for heating the middle portion side of the cells 2 in the longitudinal direction. Thereby, the temperature of the cells 2 can be heated to a range from 600 to 1000° C. and an electrolysis reaction can be generated by actuating the heating body 19. Note that FIG. 5A illustrates an example of the heating body 19 being provided in the middle portion side of the cells 2 in the longitudinal direction and being positioned in the middle portion in the direction that the cells 2 are aligned in the cell stack 7, but the heating body 19 can also be provided in the middle portion side of all the cells 2 in the longitudinal direction.

Furthermore, in a cell stack device 20 illustrated in FIG. 5B, the heating body 19 faces the middle portion side of the cell 2 in the longitudinal direction but does not face the one end portion side and the other end portion side of the cell 2.

The cells 2 are fixed to the first manifold 3 and the second manifold 5 using a sealing material (the cells 2 and the sealing material in the fixing region may be collectively referred below as a fixing section). Therefore, when the heating body 19 is provided so as to heat the entire cells 2, a thermal resistant sealing material (such as glass) must be used for fixing, but damage is liable to occur to the sealing material or the cells 2 due to thermal stress generated by a difference in thermal expansion or the like between the cells 2 and the sealing material. Consequently, increases in the fixing section temperature can be suppressed and the thermal stress generated on the fixing section can be reduced by the heating body 19 not facing the one end portion side and the other end portion side of the cells 2. Thus, damage to the cells 2 and the sealing material can be suppressed, and the cell stack device 18, 20 with improved reliability can be made. Furthermore, sealing material with a not particularly high thermal resistance (such as resin) can be used for fixing, the types of sealing material can be increased, and the number of selections for the sealing material can be increased.

Figure 6:
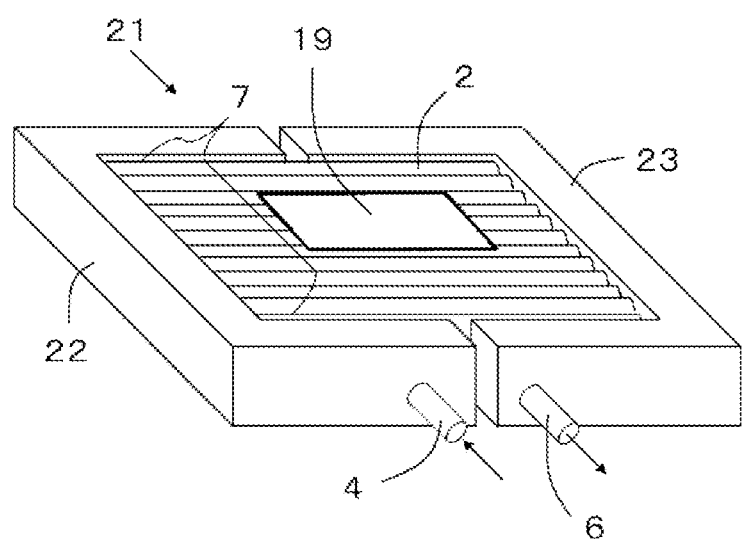
FIG. 6 is an external perspective view illustrating another example of a cell stack device of the present embodiment.

FIG. 6 is an external perspective view illustrating another example of the cell stack device of the present embodiment.

In a cell stack device 21 illustrated in FIG. 6, a first manifold 22 and a second manifold 23 extend along the cell 2 in the longitudinal direction. In other words, the first manifold 22 and the second manifold 23 are provided so as to enclose the cell stack 7, and the first manifold 22 and the second manifold 23 are U-shaped in the plan view.

To generate an electrolysis reaction in the cell 2 as described above, the cell 2 must be heated to a range from 600 to 1000° C. and that temperature must be maintained. Here, because the first manifold 22 and the second manifold 23 extend along the longitudinal direction of the cell 2 and the cell stack 7 is enclosed, the temperature of the cell stack 7 can be maintained at a high temperature and an efficient electrolysis reaction can be generated. Note that in FIG. 6, the first manifold 22 and the second manifold 23 are provided with a slight gap between these. It is assumed that each manifold is deformed by thermal expansion by the temperature of the cell stack 7 being high and then the heat being transferred to each manifold. For example, if the first manifold 22 and the second manifold 23 are disposed without a gap, each manifold is liable to be further deformed due to thermal expansion, but by being disposed with a gap in this manner, large deformations can be suppressed even when each manifold experiences a slight deformation.

Figure 7:
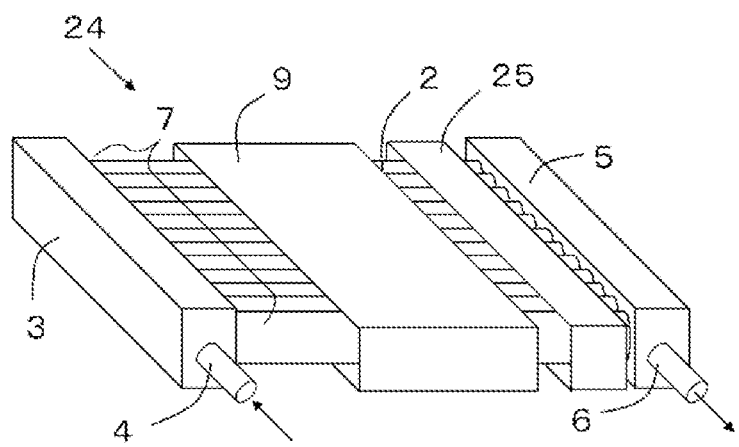
FIG. 7 is an external perspective view illustrating yet another example of a cell stack device of the present embodiment.

FIG. 7 is an external perspective view illustrating another example of the cell stack device of the present embodiment. Compared to the cell stack device 20 illustrated in FIG. 5B, one point of difference is that a cooling member 25 for cooling the cells 2 is provided on the other end portion of the cells 2 (the second manifold 5 side).

As described above, damage is liable to occur to the fixing sections between the one end portion or the other end portion of the cells 2 and the manifolds due to thermal shock or the like. For a cell stack device 24 of the present embodiment, the heating body 19 does not face the one end portion and the other end portion of the cells 2, and damage or the like occurring on the fixing section between the one end and the other end of the cells 2 and each manifold can be more effectively suppressed by providing a cooling member 25 for cooling the cells 2 on at least the one end portion and the other end portion of the cells 2.

Note that the cell stack device 24 of the present embodiment generates gas containing hydrogen by an electrolysis reaction of the water vapor supplied to the first manifold 3 in cells 2 in which the temperature has been increased by the heating body 19, and then causes the gas containing the hydrogen to flow to the second manifold 5. In other words, the temperature of the hydrogen flowing to the second manifold 5 is high, and the temperature on the other end portion side on the second manifold 5 side of the cells 2 tends to be higher than that of the one end portion side on the first manifold 3 side of the cells 2. Consequently, a cooling member 25 is preferably provided on the other end portion side of the cells 2 (the second manifold 5 side) to more effectively suppress damage to the fixing section of the cells 2 and the manifold.

Here, in FIG. 7, a flat cooling member 25 is depicted as the cooling member 25, but the cooling member 25 is not particularly limited as long as the end portion side of the cells 2 can be cooled, and for example fins, a structure forming flow paths in which refrigerant flows, or the like can be suitable used.

Note that, water, for example, can be used as the refrigerant when a structure forming flow paths in which a refrigerant flows is used as the cooling member 25. In this case, an efficient cell stack device 24 can be achieved by supplying the water vapor to the first manifold 3 via the introduction pipe 4 when the water is evaporated to become water vapor using the heat from the cell 2.

Figure 8A:
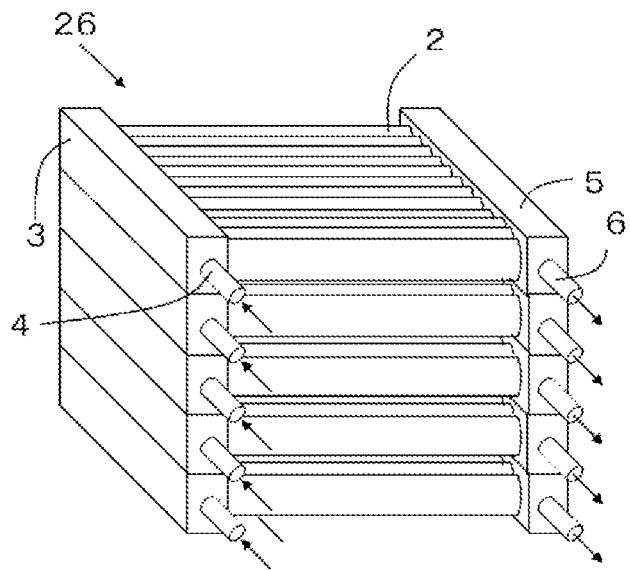
FIGS. 8A and 8B are external perspective views illustrating an example of a cell unit device of the present embodiment.
Figure 8B:
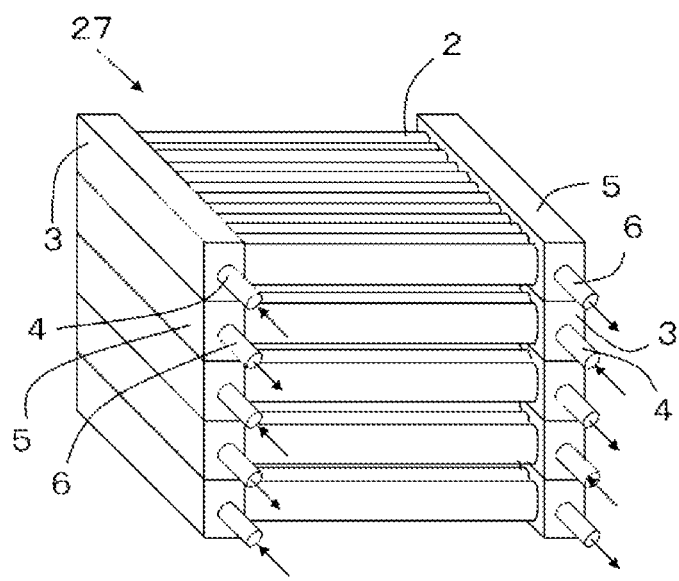

FIGS. 8A and 8B are external perspective views illustrating an example of a cell unit device of the present embodiment.

Cell unit devices 26, 27 illustrated in FIGS. 8A and 8B are configured by arranging five cell units 1 illustrated in FIG. 1A in parallel in the vertical direction. Note that in the cell unit device 26 illustrated in FIG. 8A, the cell units 1 are arranged in parallel (arranged with the same orientation) so that at least a portion of the first manifolds 3 and the second manifolds 5 overlap each other in the plan view.

In addition, the cell unit device 27 illustrated in FIG. 8B depicts an example of the cell units 1 being disposed such that the first manifolds 3 and the second manifolds 5 alternate in the vertical direction and the cell units 1 are arranged in parallel so that at least a portion of the first manifolds 3 and the second manifolds 5 overlap in the plan view (arranged to be opposite in orientation).

Such a cell unit device 26, 27 can generate a large volume of hydrogen because the cell units 1 of the present embodiment are arranged in parallel so that the cells 2 extend in the horizontal direction.

In addition, each manifold is disposed so that at least a portion overlaps in the plan view, so the cell unit device 26, 27 can be easily assembled. Note that each manifold may be preferably placed so as to overlap each other in entirety.

However, as described above, in cell 2, the temperature distribution in which the temperature of the other end portion on the second manifold 5 side is higher than that of the one end portion on the first manifold 3 side tends to be generated. In this case, when arranging first manifolds 3 in parallel or second manifolds 5 in parallel so that at least a portion thereof overlaps in order to arrange the cell units 1 in parallel as illustrated in FIG. 8A, the temperature distribution becomes more significant, and the fixing section (sealing material) in the cell 2, particularly between the other end portion and the second manifold 5, is liable to become damaged.

Therefore, an improved cell unit device 27 that is more reliable can be achieved the generation of a temperature distribution or the range of the temperature distribution can be suppressed and damage to the fixing section of the cell 2 and the manifolds can be suppressed by way of configuring the cell unit 1 by disposing the first manifold 3 and the second manifold 5 to alternate in the vertical direction as in the cell unit device 27 illustrated in FIG. 8B.

Note that in order to arrange the cell units 1 in parallel in the vertical direction, the cell units 1 (manifolds) may be disposed with a gap between the units or can be arranged in parallel with an insulating material or the like between the units.

However, the cell unit device 26, 27 described above illustrates an example of a configuration in which an introduction pipe 4 or a recovery pipe 6 connected to each manifold and water vapor is supplied or gas containing hydrogen is recovered via these, but a simpler structure can also be achieved by a structure in which the cell units 1 are arranged in parallel.

Figures 9A, 9B:
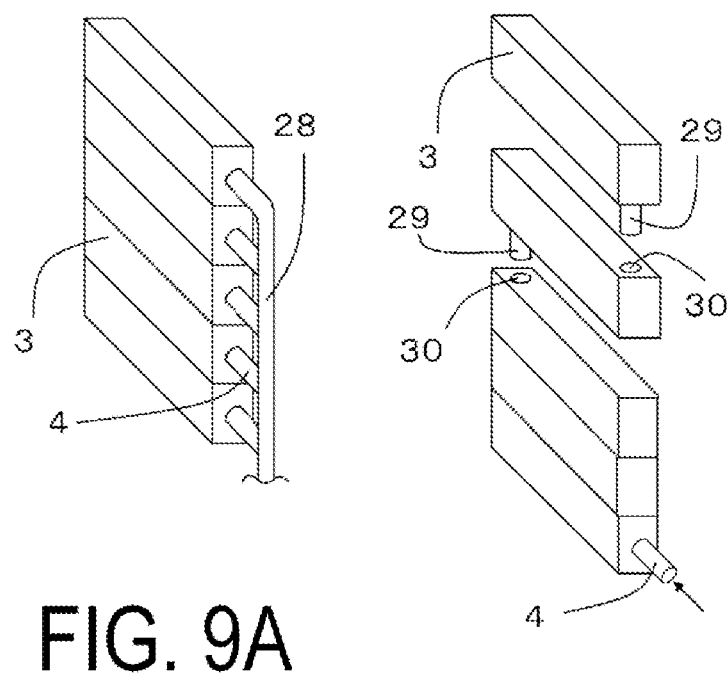
FIGS. 9A and 9B are external perspective views illustrating a connected state of a first manifold excerpted from the cell unit device of the present embodiment.

FIGS. 9A and 9B are external perspective views illustrating connected states of a first manifold excerpted from the cell unit device of the present embodiment.

FIG. 9A illustrates a configuration in which the introduction pipes 4 connected to the first manifolds 3 are connected to each other by a single connecting pipe 28. Thereby, water vapor can easily be supplied to each first manifold 3. Note that in order to control the amount of water vapor supplied to each first manifold 3, the connecting pipe 28 and introduction pipe 4 can be provided with an orifice or the like in addition to suitable varying the diameters of the connecting pipe 28 and the introduction pipe 4.

In addition, in FIG. 9B, in order to easily connect (link) first manifolds 3 together, each manifold 3 is provided with a linking pipe 29 and a linking hole 30 for the linking pipe 29 to be inserted and fixed, and first manifolds 3 can be easily linked to each other by inserting and fixing the linking pipes 29 into the linking holes 30.

In this case, in FIG. 9B, because water vapor is supplied to all the first manifolds 3 by a single introduction pipe 4, the linking pipe 29 and the linking hole 30 are preferably configured to be provided on one end portion and the other end portion, in order, on the first manifold 3 in the longitudinal direction (direction that the cells 2 are aligned) so that the water vapor is efficiently distributed to each first manifold 3. Thereby, the water vapor supplied from a single introduction pipe 4 can be efficiently distributed to each first manifold 3.

Note that in FIGS. 9A and 9B, the first manifold 3 was described, but the same configuration can also be used for the second manifold 5.

Figure 10A:
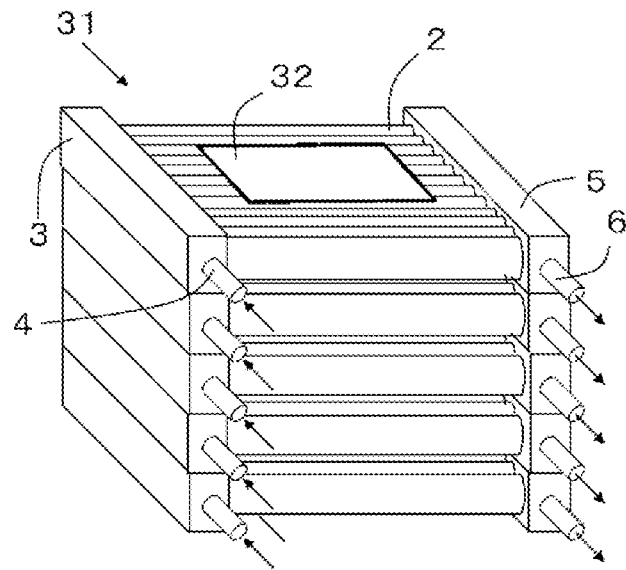
FIGS. 10A and 10B are external perspective views illustrating another example of a cell unit device of the present embodiment.
Figure 10B:
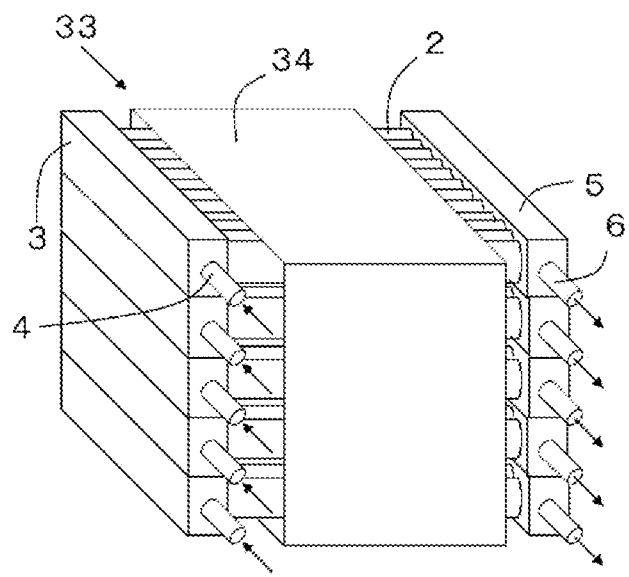

FIGS. 10A and 10B are external perspective views illustrating another example of the cell unit device of the present embodiment.

In a cell unit device 31 illustrated in FIG. 10A, in addition to the cell unit device 26 illustrated in FIG. 8A, at least some cell units 1 of the cell units 1 include a heating body 32 (such as a heater) for heating the middle portion side of the cells 2 in the longitudinal direction, and the heating body 32 faces the middle portion side of the cells 2 in the longitudinal direction and does not face the one end portion and the other end portion of the cells 2.

As described above, to perform an efficient electrolysis reaction in cell 2, the temperature of cell 2 must be heated to a range from 600 to 1000° C. Consequently, the cell stack device 31 illustrated in FIG. 10A is provided with the heating body 32 for heating the middle portion side of the cells 2 in the longitudinal direction. Thereby, the temperature of the cell 2 can be heated to a range from 600 to 1000° C. and an electrolysis reaction can be generated by actuating the heating body 32. Note that FIG. 10A illustrates an example of the heating body 32 being provided on the cell stack that is in the topmost cell unit in the middle portion of the cells 2 in the longitudinal direction and being positioned in the middle portion in the direction that the cells 2 are aligned, but the heating body 32 can also be provided in the middle portion of all the cells 2 in the longitudinal direction. Note that the heating body 32 may also be provided for each cell unit.

In addition, as described above, temperature increases in the fixing section can be suppressed and the thermal stress generated on the fixing section can be reduced by the heating body 32 not facing the one end portion side and the other end portion side of the cells 2. Thus, damage to the cells 2 and the sealing material can be suppressed, and reliability can be improved.

In addition, as illustrated in FIG. 10B, in the cell unit device 33 of the present embodiment, the heating body 34 is disposed so as to enclose the whole outer periphery of the plurality of cell units 1.

Here, in order to manufacture the cell unit device, cell stack devices 20 including the heating body 19 disposed so as to enclose the outer periphery of a single cell unit 1, as illustrated in FIG. 5B, can be disposed in parallel, but in this case, the cell unit device is liable to be larger by the heating body 19 being bulky and by the possibility of the manifolds being larger in order to connect to each cell unit 1.

Therefore, in the cell unit device 33 of the present embodiment illustrated in FIG. 10B, making the cell unit device larger can be suppressed by arranging a cell units 1 in parallel and then disposing a heating body 34 so as to surround the entire outer periphery of the plurality of cell units 1.

Then, a module of the present embodiment can be achieved by housing the cell unit 1, cell stack device 18, 20, 21, 24, and cell unit device 26, 27, 31, 33, as described above, in a housing container.

Figure 11:
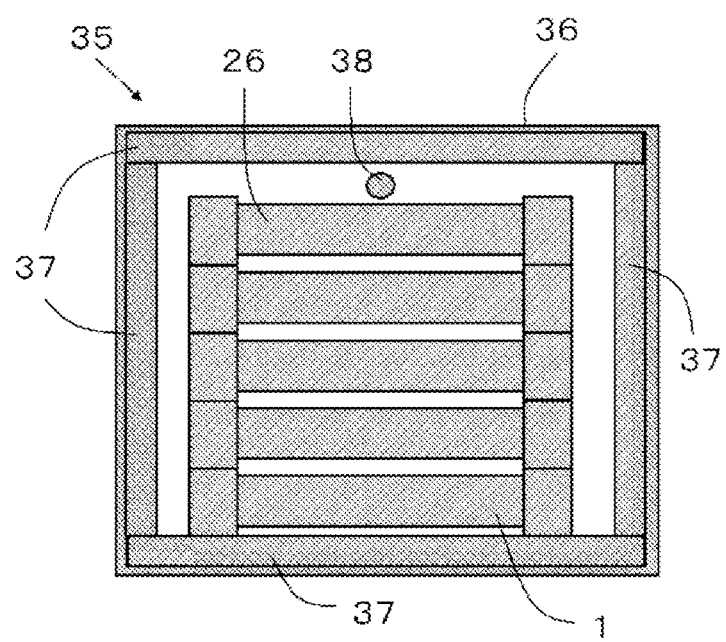
FIG. 11 is a schematic view illustrating an example of a module of the present embodiment.

FIG. 11 is a schematic view illustrating an example of the module of the present embodiment.

In a module 35 illustrated in FIG. 11, the cell unit device 26 illustrated in FIG. 8A is housed in a rectangular parallelepiped-shaped housing container 36. Note that insulating material 37 for maintaining the interior of the housing container 36 at a high temperature is provided on the inner side surface of the housing container 36. Note that the insulating material 37 may be provided on the outer side face of the housing container 36. In addition, in FIG. 11, pipes to supply water vapor to the cell unit device, recovery pipes for gas, and the like are omitted.

Here, in the cell unit device 26 housed in the module 35, a heating body such as a heater is preferably disposed separately from the cell unit device 26 in the housing container 36, for example, because no heating body is provided in the cell unit device 26. FIG. 11 illustrates an example in which a heater, which is the heating body 38, is provided on top of the cell unit device 26 separate from the cell unit device 26. Note that the location where the heating body 38 is disposed is not limited to the top of the cell unit device 26, but may also be provided between cell units 1.

In such a module 35, because the configuration of the cell unit device 26 is a simple, not only is manufacturing simple, but the module 35 with improved reaction efficiency can be achieved because the heating body 38 is provided separately from the housing container 36.

Here, the description above used the cell 2 provided with the inner electrode layer 9, the solid electrolyte layer 10, and the outer electrode layer 11 on the support body 8 as the cell 2, but a cell with a configuration in which the inner electrode layer 9 also serves as the support body 8 and that is provided with the solid electrolyte layer 10 and the outer electrode layer 11 on the inner electrode layer 9 can also be used.

In addition, the description used an electrolysis cell as the cell 2, but the cell 2 may also be a fuel cell. In this case, for example, a so called off-gas recycling type fuel cell can be achieved that reuses recovered fuel gas by supplying a fuel gas containing hydrogen from the first manifold 3, 22 and recovering the excess fuel gas not used by the cell 2 by the second manifold 5, 23.

REFERENCE NUMBER

1: Cell unit
2: Cell 3, 22: First manifold
4: Introduction pipe
5, 23: Second manifold
6: Recovery pipe
7: Cell stack
9: Inner electrode layer
10: Solid electrolyte layer
11: Outer electrode layer
14, 15: Gas-flow passage
18, 20, 21, 24: Cell stack device
19, 32, 34, 38: Heating body
26, 27, 31, 33: Cell unit device
35: Module
36: Housing container
a: Element portion

What is claimed is:

1. A cell unit comprising:
a cell stack comprising a plurality of cells, each cell of the plurality of cells having an elliptical columnar shape and comprising:
an inner electrode layer;
a solid oxide solid electrolyte layer located on the inner electrode layer;
an outer electrode layer located on the solid oxide solid electrolyte layer;
a first portion at one end of the each cell in the length direction of the cells;
a second portion at the other end of the each cell in the length direction;
a middle portion located between the first portion and the second portion; and
a distribution hole passing through from the first portion to the second portion;
a first manifold fixing the first portions of the plurality of cells, the first manifold supplying gas to the distribution holes of the plurality of cells; and
a second manifold fixing the second portions of the plurality of cells, the second manifold recovering gas discharged from the distribution holes of the plurality of cells,
wherein the each cell comprises an interconnector electrically connected to the inner electrode layer,
the plurality of cells comprising a first cell and a second cell adjacent to the first cell,
the second cell comprising the outer electrode layer, the outer electrode layer comprising:
a first surface close to the solid oxide solid electrolyte layer of the second cell;
a second surface close to the first cell;
wherein the interconnector of the first cell is bonded to the second surface,
a first layer; and
a second layer closer to the first cell than the first layer, and
wherein the first layer has a higher porosity than the second layer.

2. The cell unit according to claim 1, wherein the plurality of cells are arranged in a horizontal direction.

3. The cell unit according to claim 1, wherein a gas-flow passage for discharging gas from the plurality of cells is provided in the first surface.

4. A cell stack device comprising:
the cell unit according to claim 1;
and a heating body for heating the middle portion of each cell of the plurality of cells in the longitudinal direction.

5. The cell stack device according to claim 4, wherein the heating body does not face the first portions and the second portions of the plurality of cells.

6. The cell stack device according to claim 4, wherein the first manifold and the second manifold extend along the plurality of cells in a longitudinal direction of the cell stack.

7. The cell stack device according to claim 4 comprising a cooling member on at least the first portions or the second portions of the plurality of cells.

8. A cell unit device comprising:
a plurality of the cell units according to claim 1; and
the plurality of cell units being arranged in parallel in a vertical direction so that the plurality of cells of each cell unit of the plurality of cell units are disposed in a horizontal direction.

9. The cell unit device according to claim 8, wherein the first manifold of each cell unit of the plurality of cell units and the second manifold of the each cell unit are disposed to alternate in the vertical direction, and
the first manifold of the each cell unit and the second manifold of the each cell unit overlap in a plan view.

10. The cell unit device according to claim 8, wherein the first manifolds of the plurality of cell units overlap each other in a plan view, and
the second manifolds of the plurality of cell units overlap each other in the plan view.

11. The cell unit device according to claim 8, wherein
at least one of the plurality of cell units comprises a heating body for heating the middle portions of the plurality of cells,
the heating body faces the middle portions, and
the heating body does not face the first portions and the second portions of the plurality of cells.

12. The cell unit device according to claim 11, wherein the heating body encloses the entire outer periphery of the cell units.

13. A module comprising:
a housing container;
the cell unit according to claim 1 being housed in the housing container.

14. A module comprising:
a housing container;
the cell unit according to claim 1 being housed in the housing container; and
a heating body being disposed in the housing container, the heating body for heating the middle portions of the plurality of cells and being provided separately from the cell unit.

* * * * *